Feb. 2, 1954  A. J. MIJNLIEFF ET AL  2,667,783
HEAT CONSUMPTION METER
Filed April 25, 1951  2 Sheets-Sheet 1

INVENTORS
ARY J. MIJNLIEFF
BAREND A. VAN RIETSCHOTEN
PIETER LOOS
By:
Haseltine, Lake & Co.
AGENTS Feb. 2, 1954 A. J. MIJNLIEFF ET AL 2,667,783
HEAT CONSUMPTION METER
Filed April 25, 1951 2 Sheets-Sheet 2

INVENTOR
ARY J. MIJNLIEFF
BAREND A. VAN RIETSCHOTEN
PIETER LOOS
BY
Hazeltine, Lake & Co.
AGENTS Patented Feb. 2, 1954

2,667,783

UNITED STATES PATENT OFFICE 2,667,783

HEAT CONSUMPTION METER

Ary J. Mijnlieff, Zeist, and Barend A. van Rietschoten and Pieter Loos, Utrecht, Netherlands, assignors to N. V. Provinciaal en Gemeentelijk Utrechts Stroomleveringsbedrijf, Utrecht, Netherlands, a company of the Netherlands Application April 25, 1951, Serial No. 222,788

Claims priority, application Netherlands April 28, 1950

1 Claim. (Cl. 73—193)

This invention relates to a heat consumption meter for measuring the quantity of heat given up by a flowing heating fluid and provided with a flow meter and with two Bourdon tube-thermometers, the deflection of which is transmitted to a counting mechanism. Such a meter may e. g. be used for measuring the heat consumption of a heating plant.

The hitherto known heat meters of this kind have the drawback that they do not accurately operate and the present invention has for its object to obtain a meter which accurately operates for a large temperature range and is still of simple construction.

According to the invention the flow measuring meter drives a toothed cylinder, the number of teeth of which varies in axial direction and said cylinder cooperates with a toothed wheel, which is axially slidable on a shaft driving the counting mechanism and said toothed wheel is shifted by a pivotal lever having a fixed fulcrum and loosely engaging the slidable toothed wheel, a floating lever being pivoted to said pivotal lever and each end of said floating lever being coupled to one of the Bourdon tubes of the thermometers. In order to prevent the slidable toothed wheel from jamming on its shaft and yet to obtain a correct guide of the toothed wheel said shaft preferably has an angular, e. g. a square cross section. As the pivotal lever has a fixed fulcrum its position relative to the slidable toothed wheel is varied and in order to now obtain a displacement of the toothed wheel linearly proportional to the temperature differential to which the Bourdon tube-thermometers are subjected at least one of the cooperating surfaces of the hub of the toothed wheel and of the pivotal lever is chamfered.

In the accompanying drawing which shows an embodiment of the heat consumption meter according to the invention, Fig. 1 is an elevational view of the driving mechanism of the meter.

Figure 1:
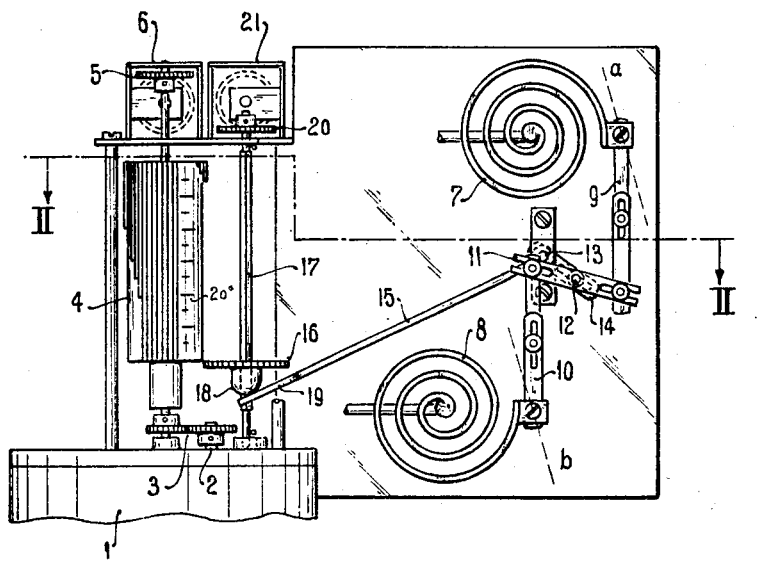
Figure 2:
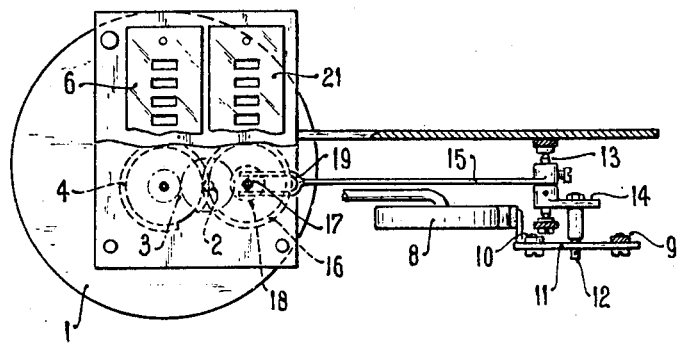
Fig. 2 is a plan view of the meter and partly a horizontal sectional view on the line II—II of Fig. 1.

The water meter 1 of the continuous flow type and of which only the upper part of the casing is shown is provided with e. g. a blade wheel not illustrated in the drawing and the shaft 2 of which drives a toothed cylinder 4 through the intermediary of a tooth gear 3. The shaft of the cylinder 4 carries at its upper end a toothed wheel 5 which actuates a counting mechanism 6, which thus indicates the quantity of water flowing through the meter.

Each of the Bourdon tubes 7 and 8 forms part of a thermometer the temperature feelers of which are placed in the forward flow of the hot water and the return flow of the cooled water respectively of the heating plant. Pivotally connected to the free end of each Bourdon tube is a link 9 and 10 respectively and each of said links is pivotally connected to an arm of a lever 11 which is pivotally mounted on a pin 12 secured to a lever arm 14 rigidly secured on a shaft 13. Said shaft carries a lever arm 15 engaging a toothed wheel 16 slidably mounted on a square shaft 17 and adapted to mesh with the teeth of cylinder 4. The hub 18 of the toothed wheel 16 is chamfered and the fork shaped end 19 of lever arm 15 loosely engages said chamfered hub. The shaft 17 at its upper end carries a toothed wheel 20 driving a counting mechanism 21.

The thermometers and also the Bourdon tubes 7 and 8 connected thereto are filled with mercury having a very high pressure of e. g. 150 atmospheres. The Bourdon tubes 7, 8 which preferably have an equal shape are mounted in such a manner that upon expansion of the mercury the free ends of the tubes are displaced along parallel lines $a$ and $b$ respectively. When the forward flow has the same temperature as the return flow of the heating fluid the pivot 12 of floating lever 11 remains stationary. If, however, the thermometers are subjected to a temperature difference the pivot 12 of the floating lever 11 will be displaced so that the axis 13 which is supported in fixed bearings is rotated and the lever arm 15 shifts the toothed wheel 16 along the shaft 17. Said toothed wheel therefore meshes with the teeth of cylinder 4 so that said latter rotates the toothed wheel 16 with its shaft 17 driving the counting mechanism 21. Since the number of teeth on the cylinder 4 increases in upward direction the toothed wheel 16 will be rotated through an angle in conformity with the displacement which the wheel performs under the action of the lever arm 15 so that the indication of the counting mechanism 21 will be dependent both on the rotation of the blade wheel of the water meter 1 and on the deflection of the Bourdon tubes 7 and 8. The driving mechanism for shifting the toothed wheel 16 and the variation of the number of teeth on the cylinder 4 are so chosen that the counting mechanism 21 indicates the product of the quantity of water flowing through the water meter 1 and the temperature differential, thus the quantity of heat consumed in the plant. Owing to the particular construction of the coupling mechanism between the Bourdon tubes 7, 8 and the slidable toothed wheel 16 the displacement of said wheel is linearly proportional to the temperature difference to which the Bourdon tube-thermometers are subjected.

The extent of the displacement of the wheel 16 may be varied by adjusting the pivot 12 of the floating lever 11 in a slot of arm 14 whereby the active length of said arm is varied.

It is to be noted that in the illustrated embodiment the number of teeth on the lower part of cylinder 4 remains constant so that for the lower portion of the stroke of the toothed wheel 16 a constant minimum quantity of heat independent of the temperature differential is recorded on the counting mechanism 21. Said minimum quantity of heat may e. g. be applied for temperature differentials lower than 20° C.

The part of the cylinder 4 not provided with teeth should have a somewhat smaller radius than the bottom of the holes between the teeth, in order to prevent rotation of the slidable wheel 16 by friction when contacting with the smooth part of the cylinder. It should also be taken account of the fact that with an interrupted toothing the driven wheel is already rotated before the teeth are completely in mesh so that the angle of rotation of the driven wheel is larger than the angle corresponding to the length of the toothed arc of the driving cylinder.

Figure 3:
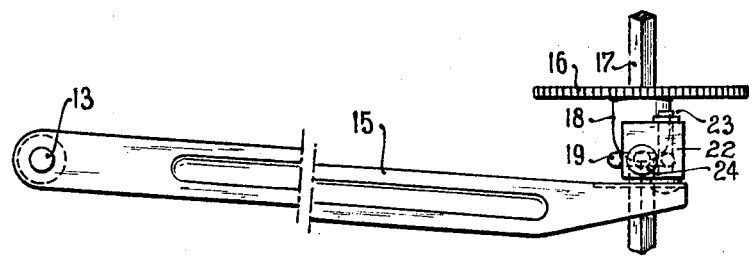
Figs. 3 and 4 show a side view and a plan view respectively of the pivotal lever according to a somewhat modified construction.
Figure 4:
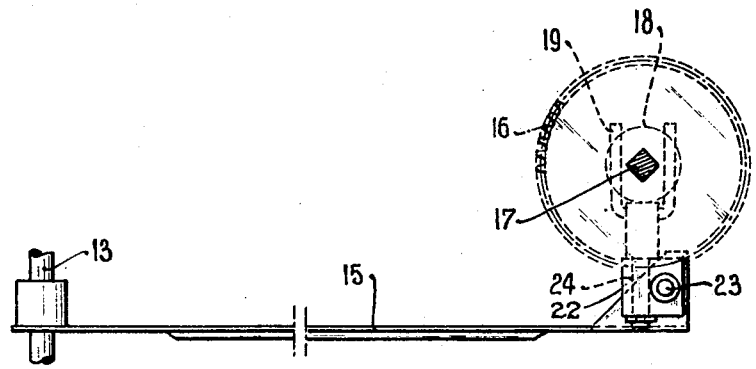

With the modified construction of the pivotal lever 15 shown in Figs. 3 and 4 the forked end 19 is formed as a separate part which by means of a journal 24 is rotatably supported in a block 22. Said block in turn is pivoted on a stud 23 rigidly secured to lever 15, so that fork 19 may rotate about two axes which are perpendicular to each other, whereby an exactly vertical displacement of the fork 19 and an excellent engagement of same with the curved surface of the hub 18 of wheel 16 is secured.

The described and illustrated heat meter may be mounted on a water meter of every kind provided with a dry running counting mechanism which is then removed and replaced by the heat meter.

The accuracy and the starting resistance of the water meter are then favourably influence by the provision of the heat meter as for the dry running counting mechanism of the flow meter only the cylinder 4 and two simple counting mechanisms are substituted.

The invention is not restricted to the illustrated embodiment as various modifications are possible within the scope of the invention. Thus instead of the inner ends of the Bourdon tubes 7 and 8 also their outer ends may be stationary so that in said instance the links 9 and 10 are connected to the inner ends of the Bourdon tubes. The number of teeth on the cylinder 4 instead of in upward direction may also increase in downward direction.

What we claim is:

A heat consumption meter for measuring the quantity of heat given up by a flowing heating fluid comprising in combination a flow meter, a toothed cylinder driven by said flow meter and the number of teeth of which varies in axial direction, a toothed wheel cooperating with said toothed cylinder and having a hub, a shaft on which said toothed wheel is slidably mounted, a counting mechanism driven by said shaft, a pivotal lever having a fixed fulcrum, a stud carried by said pivotal lever, a bearing block pivotally mounted on said stud, a forked part journalled in said bearing block perpendicularly to said stud and engaging the hub of said toothed wheel, a floating lever pivoted to said pivotal lever and two Bourdon tube-thermometers coupled to opposite ends of said floating lever.

ARY J. MIJNLIEFF.
BAREND A. van RIETSCHOTEN.
PIETER LOOS.

References Cited in the file of this patent

UNITED STATES PATENTS

| Number | Name | Date |
|---|---|---|
| 1,894,449 | Sandvoss | Jan. 17, 1933 |
| 2,123,725 | Handwerk | July 12, 1938 |
| 2,230,544 | Noble | Feb. 4, 1941 |

FOREIGN PATENTS

| Number | Country | Date |
|---|---|---|
| 561,225 | Germany | Oct. 12, 1932 |
| 913,699 | France | June 3, 1946 |
| 596,054 | Great Britain | Dec. 24, 1947 |